(12) United States Patent
Bradford

(10) Patent No.: US 8,306,983 B2
(45) Date of Patent: Nov. 6, 2012

(54) SEMANTIC SPACE CONFIGURATION

(75) Inventor: Roger B. Bradford, Great Falls, VA (US)

(73) Assignee: Agilex Technologies, Inc., Chantilly, VA (US)

( * ) Notice: Subject to any disclaimer, the term of this patent is extended or adjusted under 35 U.S.C. 154(b) by 368 days.

(21) Appl. No.: 12/606,092

(22) Filed: Oct. 26, 2009

(65) Prior Publication Data

US 2011/0099162 A1    Apr. 28, 2011

(51) Int. Cl.
*G06F 7/00*    (2006.01)
(52) U.S. Cl. .................... 707/739; 707/748; 707/723
(58) Field of Classification Search .............. 707/739, 707/748, 723
See application file for complete search history.

(56) References Cited

U.S. PATENT DOCUMENTS

| | | | | |
|---|---|---|---|---|
| 7,113,943 B2* | 9/2006 | Bradford et al. | .............. | 707/739 |
| 7,483,892 B1* | 1/2009 | Sommer et al. | ........................ | 1/1 |
| 7,765,098 B2* | 7/2010 | Bradford | .......................... | 704/9 |
| 7,788,264 B2* | 8/2010 | Zhu et al. | ...................... | 707/739 |

OTHER PUBLICATIONS

"Term Representation with Generalized Latent Semantic Analysic" Matveeva et al., Department of Computer Science, the University of Chicago, Aug. 23, 2005.*

* cited by examiner

*Primary Examiner* — Etienne LeRoux
*Assistant Examiner* — Cindy Nguyen
(74) *Attorney, Agent, or Firm* — Johnson, Marcou & Isaacs, LLC; Michael J. Dimino

(57) ABSTRACT

Representing in a database, a collection of items characterized by features. In a data processing system, determining a semantic space representations of the features across the collection. Each representation characterized by parameters and settings, and differing from each other by only one of: the value of one parameter, and the configuration of one setting. Determining, for each feature pair of a set of feature pairs, the relatedness of the first feature to the second feature in each semantic space representation. And representing the collection by the semantic space that provides the best aggregate relatedness across the set of feature pairs.

8 Claims, 10 Drawing Sheets

Variation of average cosine with dimension

Large divergence at both low and high k values for term pair judge – court

SEMANTIC SPACE CONFIGURATION

FIELD OF THE TECHNOLOGY

The technology disclosed herein relates to databases built on vector space representations of items and features. Enabling embodiments disclosed herein relate to determining free parameters and other settings for a favorable configuration of a semantic vector space.

BACKGROUND

Use of semantic representation spaces is an approach of growing interest for a wide range of information processing problems. This is particularly true in the case of text analysis. The principal idea behind the approach is to replace the complexity of linguistic structures with simpler spatial analogs. Dimensionality reduction is one aspect of the approach. Typically, modern semantic representation spaces employ from a few tens to several hundreds of dimensions. For large collections (e.g., millions of documents) this corresponds to a reduction in dimensionality by a factor of more than 1,000. The approach is applicable to arbitrary data types, e.g., faces and facial features, but is best known in the area of text analysis.

The best known of the semantic vector space techniques is latent semantic indexing (LSI). LSI uses the technique of singular value decomposition (SVD) to create a representation space in such a manner that the semantics of the input data are automatically captured in the space. Although primarily known as a technique for text processing, LSI can be applied to any collection of items wherein each can be represented as a collection of features. When applied to a collection of documents, LSI creates a representation space in which each document is represented by a k-dimensional vector. Similarly, each term that occurs in the collection (perhaps excepting some that are treated as stop words) is represented by a k-dimensional vector. For two blocks of text, proximity of their representation vectors in such a space has been shown to be a remarkably effective surrogate for similarity in a conceptual sense, as judged by humans. Although there are other methods for generating semantic representation spaces, LSI can serve as a good model for the mechanics of creating such a space. All such spaces have associated processing decisions to be made, and free parameters to be set.

In creating an LSI representation space, processing parameters to be set include: dimensionality of the space (e.g., the number of singular values retained); local and global weighting factors that will be applied; the number of times a given term must occur in the collection before it is included in the term-document matrix used to create the LSI space; the number of documents a term must occur in for it to be included in the term-document matrix.

In addition to selecting these parameters, choices are made regarding preprocessing of the text. For example, decisions can be made regarding: how to treat numbers, phrases, and named entities; whether or not to employ stemming or to apply part-of-speech tags; how many stop words will be employed, and which ones.

Choices also can be made regarding the comparison metric to be used in the space and whether or not to normalize the vectors.

The decisions made and parameters chosen can have an impact on the effectiveness of LSI for given applications. This is also true for the other techniques used to create semantic representation spaces.

In further detail, LSI is a machine learning technique that takes as input a collection of items characterized by item features and produces as output a vector space representation of the items and item features of the collection, i.e., a semantic space. The central feature of LSI is the use of SVD to achieve a large-scale dimensionality reduction for the problem addressed. The technique of LSI includes the following steps. A matrix is formed, wherein each row corresponds to a feature that appears in the items of interest, and each column corresponds to an item. Each element (m, n) in the matrix corresponds to the number of times that the feature m occurs in item n. Local and global term weighting is applied to the entries in the feature-item matrix. SVD is used to reduce the feature-item matrix to a product of three matrices, one of which has nonzero values (the singular values) only on the diagonal. Dimensionality is reduced by deleting all but the k largest values on this diagonal, together with the corresponding columns in the other two matrices. This truncation process is used to generate a k-dimensional vector space. Both features and items are represented by k-dimensional vectors in this vector space. The relatedness of any two objects (e.g., items, item features) represented in the space is reflected by the proximity of their representation vectors, generally using a cosine measure of the angle between two vectors.

Implementing LSI in a data processing environment typically requires configuring free parameters, e.g., k, and other characteristics, e.g., lists of stop words to be ignored in forming the pre-SVD matrix, the comparison metric employed in the space after SVD.

SUMMARY

The technology includes systems, methods, and computer program products for representing in a database, a collection of items characterized by features. Embodiments include determining a plurality of semantic space representations of the features across the collection. Each representation is characterized by parameters and settings, and differs from other representations by only one of: the value of one parameter, and the configuration of one setting. Embodiments further include determining, for each feature pair of a set of feature pairs, the relatedness of the first feature to the second feature in each semantic space representation. The collection is represented by the semantic space that provides the best aggregate relatedness across the set of feature pairs.

In some embodiments, the relatedness of the first feature to the second feature is determined as rank of the second feature in response to a query comprising the first feature into each semantic space. In some embodiments the aggregate relatedness is measured as the average determined rank. In some embodiments each representation differs from each other representation by the value of dimensionality k.

DETAILED DESCRIPTION

Figure 1:
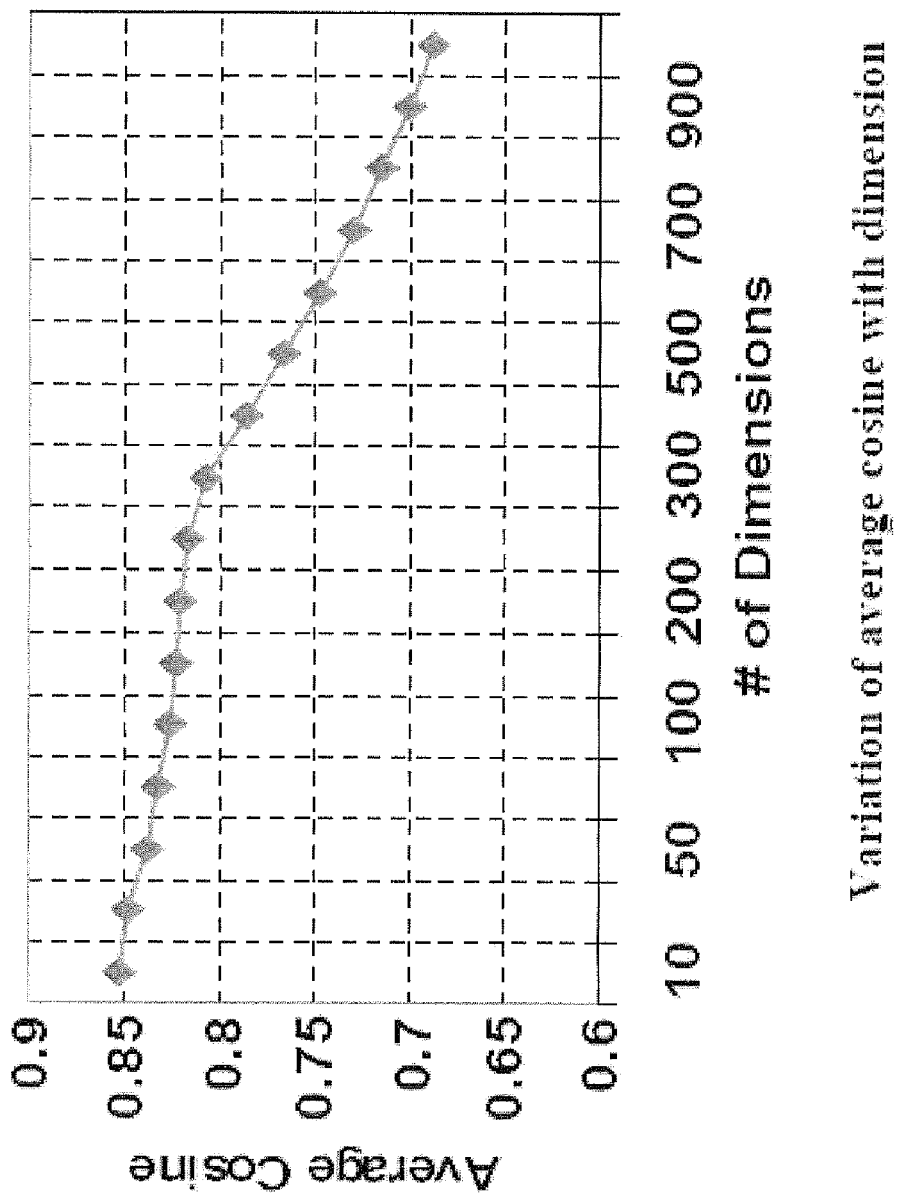
FIG. 1 illustrates the variation of the average cosine between vectors representing terms, for term pairs in S, versus the number of dimensions k in LSI spaces constructed to represent $S_{5M}$.

Reference will now be made in detail to embodiments of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one embodiment can be used on another embodiment to yield a still further embodiment. Thus, it is intended that the present technology cover such modifications and variations that come within the scope of the technology.

The present technology enables determination of favorable free parameters and settings for semantic spaces. This disclosure enables understanding of the principles of the present technology in the context of LSI with documents as items, words as item features, and dimensionality k of the SVD matrix as the implementation characteristic. The principles can be applied to other implementation characteristics, e.g., free parameters such as minimum number of times a given term must occur in the collection for it to be included in the term-document matrix used to create the space, and settings such stemming on/off in LSI, and other semantic space techniques such as semi-discrete decomposition, non-negative matrix factorization, and latent relational analysis.

LSI is used in a wide variety of commercial applications. In these applications, the processing time and random access memory (RAM) required for SVD computation, and the processing time and RAM required during LSI retrieval operations are all roughly linear in the number of dimensions, k, chosen for the LSI representation space. In large-scale commercial LSI applications, reducing k could be of significant value in reducing server costs.

In commercial applications, the choice of the parameter k is of particular importance. Early studies of LSI indicated that performance on a variety of tasks was heavily dependent upon the value of k. Choosing too low a vale for k did not provide sufficient fidelity to the real world relationships among terms and documents. Choosing too large a value introduced too much noise. Several experiments showed that a value of k=300 produced optimal results for specific tasks. Based on these investigations, k=300 has over time become something of a default for k in LSI applications. There is a large body of experience in working with this value for k in commercial practice. Across a wide range of applications, this choice of dimensionality has been shown to produce highly useful indications of term relatedness. Moreover, in multiple applications, term proximity (the cosine between the representation vectors corresponding to the terms typically is used as the proximity measure) in LSI spaces with k=300 has been shown to correlate well with human judgment of proximity of those terms in a semantic sense.

In large-scale commercial applications, the choice of k has a significant impact on required hardware resources. The processing time and RAM required for SVD computation, and the processing time and RAM required during LSI retrieval operations are all roughly linear in the number of dimensions chosen. In large-scale applications, a reduction in k can translate directly into reductions in server costs and improvements in system performance.

No one choice of dimensionality will work well for all related term pairs. The present technology provides systems and methods for determining a value for k that provides "optimum" average performance and avoids exponential divergence of term ranks. Throughout this disclosure, "optimum" refers to local optimum as measured by a predetermined characteristic (e.g., average rank as described below) given a predetermined set of expectations (e.g., pairs of terms that have been observed to be closely related in the real world).

In an LSI space, one may compare terms with terms, terms with documents, or documents with documents. In many contemporary applications of LSI, relations between terms are of primary importance. Examples include ontology construction, electronic data discovery, and intelligence analysis. In particular, there is interest in determining the degree of relatedness between entities such as names of people, locations, and organizations. Most studies of optimum dimensionality have focused on comparisons between documents. Emphasis on mean square error or precision/recall measures for documents may mask large variations in relationships between specific term pairs. In part because of this concern, this disclosure illustrates the present technology by focusing on relationships between terms. Accordingly, while the technology is applicable to determining free parameters and the configuration of other settings in semantic spaces generally, the results are most applicable to LSI applications where term comparisons are of particular importance.

Consider three LSI spaces based on indexing test collections of one, two, and five million documents: $S_{1M}$, $S_{2M}$, and $S_{5M}$ respectively. The documents in each collection are a subset of the documents in the next larger collection. The documents are news articles, covering the time frame 1998 to 2006. News articles are considered particularly useful for this investigation for the following reasons. The articles cover a wide range of topics, improving the likelihood that results obtained may be broadly applicable. There are a large number of occurrences of terms of particular interest for applications, such as names of persons, organizations, and locations. Prior work has shown that when news articles are used as a training corpus, measures of semantic relatedness produce a particularly good match to human judgment.

The characteristics of the test collections used are shown in Table 1. For each collection, only terms that occurred at least twice and in at least two different documents were indexed. This is a common convention when creating LSI representation spaces. This constraint eliminates large numbers of noise terms.

TABLE 1

Characteristics of Test Data Sets

|  | Timeframe | # of Documents | # of Unique Terms |
|---|---|---|---|
| 1M Doc Set | April 2004-September 2006 | 1,000,000 | 714,855 |
| 2M Doc Set | October 2003-September 2006 | 2,000,000 | 1,044,338 |
| 5M Doc Set | December 1998-September 2006 | 5,000,000 | 1,809,597 |

Contemporary applications of semantic spaces to collections of documents principally exploit the ability of the technique to discern relationships among terms and documents. It is beneficial for the representation space to present close relationships between items that have close real world associations.

In this disclosure, pairs of terms are examined that are generally acknowledged to have close associations in the real world. The 250 pairs employed include: country-capital pairs, (e.g., "Denmark-Copenhagen," "Hungary-Budapest"); common synonyms (e.g., "accelerate-quicken," "doctor-physician"); person-country pairs (e.g., "Castro-Cuba," "Musharraf-Pakistan"); person-occupation pairs (e.g., "Einstein-physicist," "Picasso-painter"); words and their plural forms (e.g., "bacterium-bacteria," "tooth-teeth"); nouns and their adjectival forms (e.g., "America-American," "Sweden-Swedish"); noun-verb pairs (e.g. "discus s-discus sion," "attack-attacker"); verb declensions (e.g., "swim-swam," "run-running"); words and their contractions (e.g., "automobile-auto," "gyroscope-gyro"); contextually related terms (e.g., "astronomy-telescope," "volcano-lava"). Appendix I is a list of the term pairs employed. In some embodiments, the list of term pair can be specific to the problem domain of the intended database, e.g., a space intended to reflect political associations in Afghanistan can use term pairs reflective of known political associations in that country; a database intended to reflect the manufacture, use, and distribution of a controlled substance can include term pairs reflective of the chemistry, street slang, and known illicit substance dealers.

For each term pair of interest, one term can be treated as a query in the space. Vectors for other terms can be ranked in relationship among results returned from the semantic space in response to this query, based on the cosine measure between those vectors and the query vector. The rank of the paired term in this list can be used as the measure of relatedness between the two terms within the particular semantic space. Rank can be used to allow comparisons across different collections and across different values of k. Rankings can be determined for discrete values of k across a range of interest. For the sample data sets and the 250 pairs, k=10, 25, 50, 75, 100, 150, 200, 250, 400, 500, 600, 700, 800, 900, and 1000.

Cosine values, per se, are useable in embodiments of the technology, but not preferred, as a measure for two reasons. First, cosine values are not comparable across collections, even where the spaces for each collection are built using the same parameters and settings. Second, and more importantly, cosine measures vary with dimension within a collection. For LSI spaces in general, higher dimensionality yields lower mean cosine values. FIG. 1 shows the average cosine between vectors representing terms for term pairs in $S_{5M}$. FIG. 1 is based on 1,000 term pairs that all were related to a given subject, but not chosen specifically to be very closely associated. If the term pars had been chosen at random, the actual cosine values would be much lower, but the shape of the curve would similar.

Figure 2:
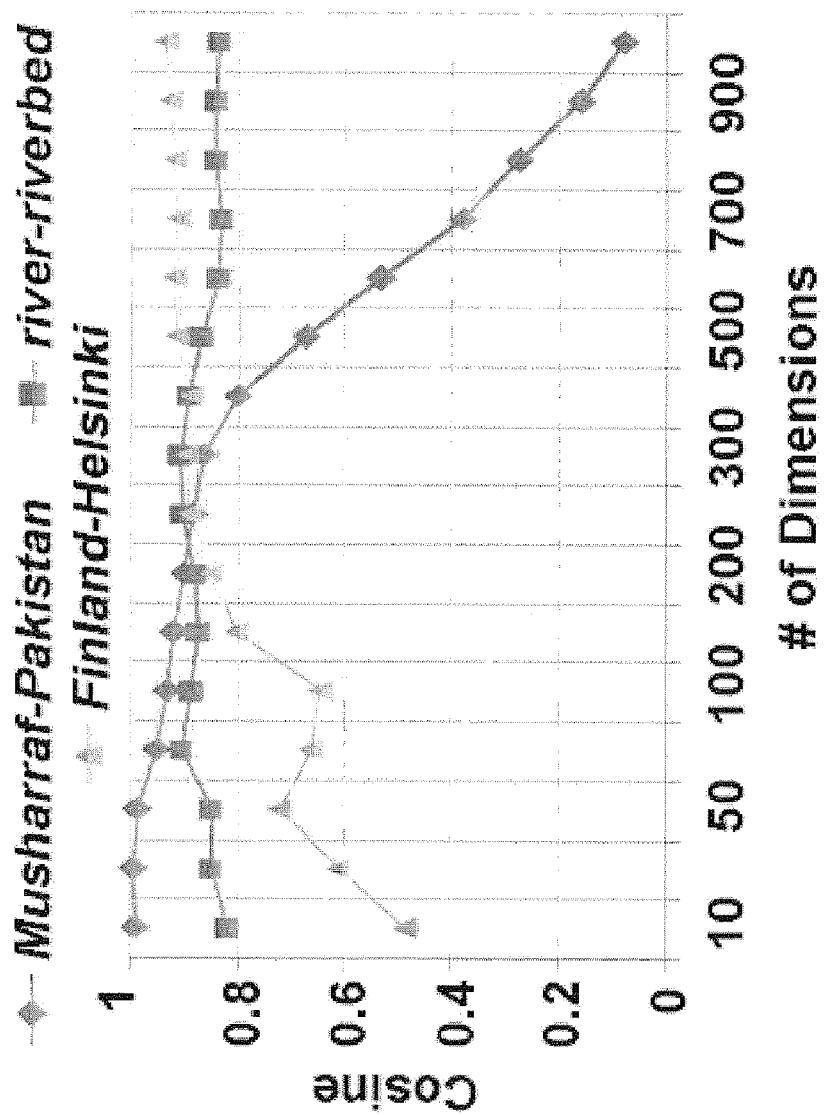
FIG. 2 illustrates the variation in cosine between vectors representing terms in the term pairs "Musharraf"-"Pakistan," "river"-"riverbed," and "Finland"-"Helsinki" in LSI spaces of dimension k constructed to represent $S_{5M}$.

Although the average cosines comprise a smooth, monotonically decreasing curve across a range of k, individual cosines vary widely in their behavior. FIG. 2 shows examples of cosine variation with dimension for three cases in $S_{5M}$ that differ significantly from the average. The cosine values for the "Musharraf-Pakistan" test pair decrease very rapidly with increasing dimension. The curve for the "river-riverbed" term pair is relatively constant across the dimensions tested. The curve for the "Finland-Helsinki" term pair increases significantly with increasing dimension.

For each term pair considered, test results are shown here as the rank of the second term with respect to the first term, plotted versus number of dimensions k in the space. Several types of behavior are noted. For some term pairs, the plot of experimental results is nearly flat across the dimensions tested. More commonly, there is divergence of the rank values at low dimensionality. This is most pronounced at the lowest dimensions tested, k=10 and k=25. In some cases, divergence at these low dimensions is exponential (e.g., a term that has rank=2 at k=300 will have rank>100,000 at k=10). There generally is some divergence in rank at the highest dimensions tested, particularly at k=1000. In some cases, the divergence at the high dimensions is exponential. Typically there is some divergence at both low and high dimensionality, with the divergence at low k values being much greater than that at high values.

The varying patterns of rank divergence complicate the issue of determining an effective k value for a given application. Most evaluations of optimum rank have focused on average behavior. In some applications, this would be quite appropriate. However, in other applications, the exponential divergence for some term pairs should be avoided.

Figure 3:
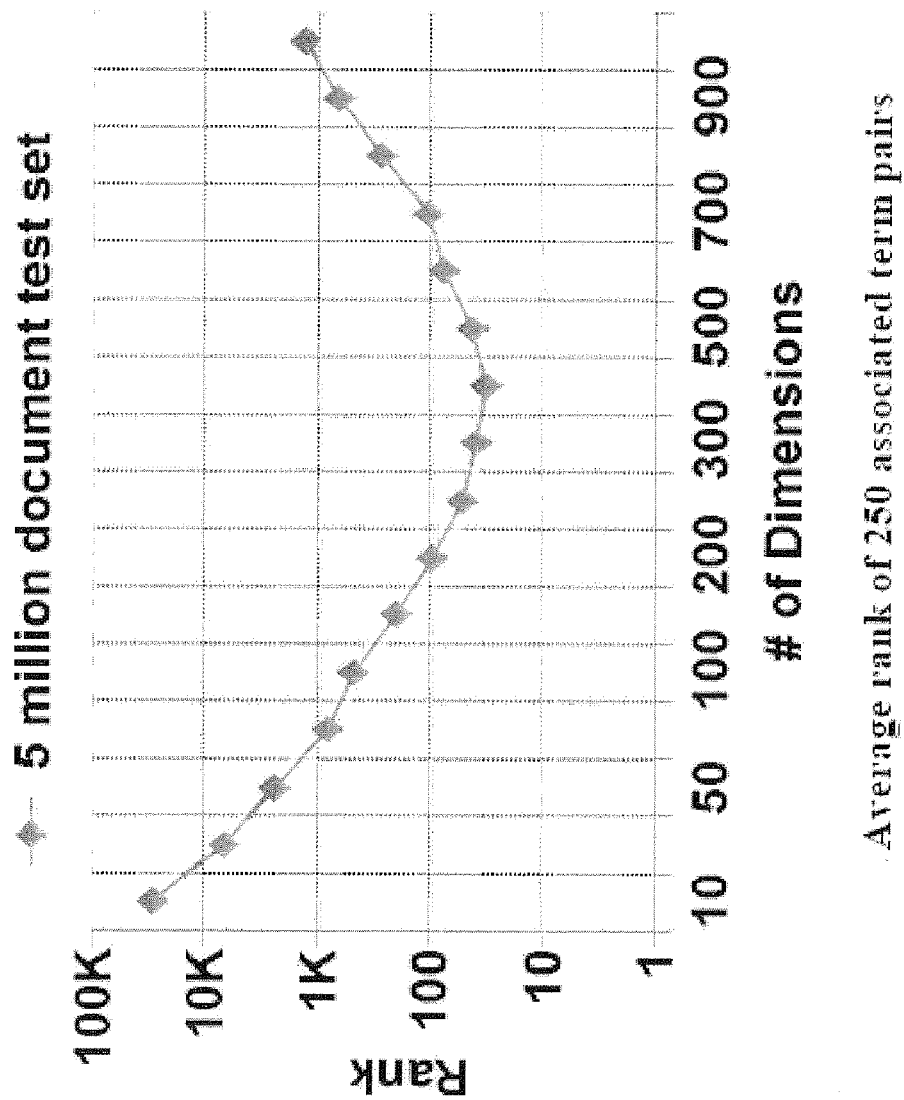
FIG. 3 illustrates the average rank of the second member of each of 250 term pairs in LSI spaces of dimension k constructed to represent $S_{5M}$, with k varied across 16 values between 10 and 1000, where rank is ordered by cosine between vectors representing terms in a term pair.

FIG. 3 shows the average rank for 250 pairs of associated terms (included herein at Appendix I) in $S_{5M}$ at different values of k. The average rank of the term pairs is comparable over the range k=300 to k=500, with no major differences. Above 500 and below 300 dimensions, however, the ranks diverge relatively rapidly. The results indicate that the optimal average performance over the given range, given the term pair set used and the configuration of other parameters and settings in the creation of the space, for the given collection, can be obtained with k≈2400.

Figure 4:
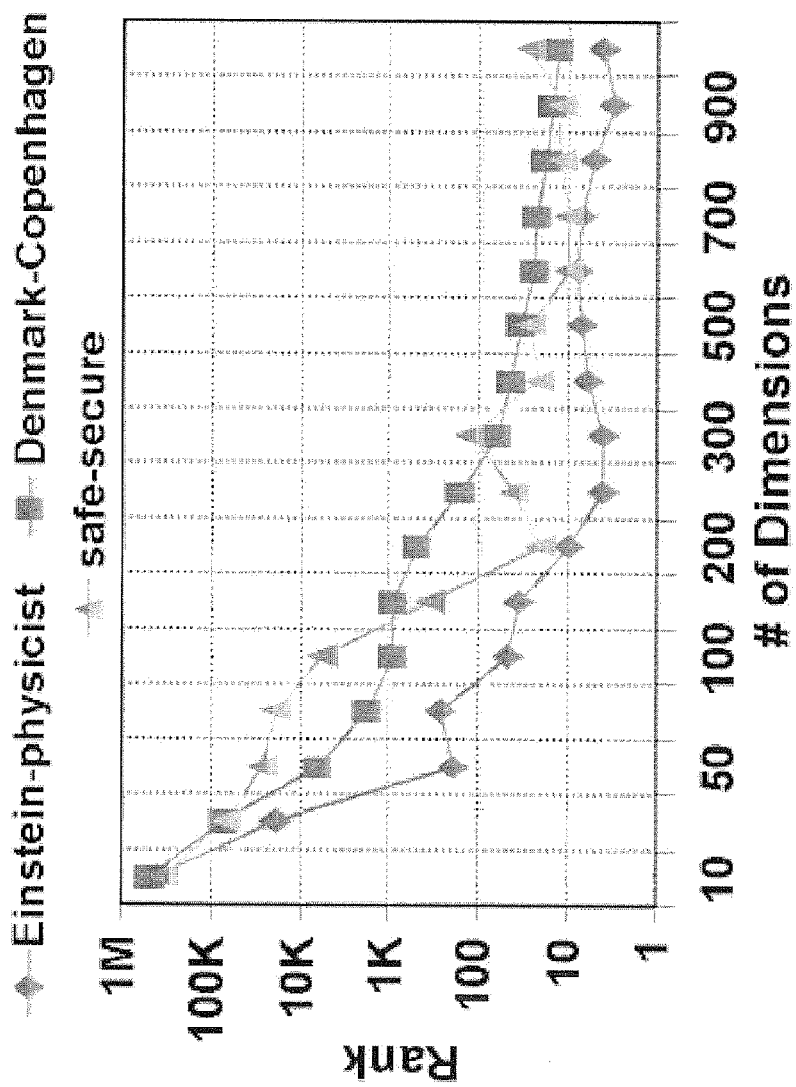
FIG. 4 illustrates the variation in cosine between vectors representing terms in the pairs "Einstein"-"physicist," "Denmark"-"Copenhagen," and "safe"-"secure" in LSI spaces of dimension k constructed to represent $S_{5M}$.

There are some term pairs that demonstrate rapid divergence at low or high dimensionality (or both). FIG. 4 shows examples of term pairs exhibiting exponential divergence at low dimensionality.

In some applications, users want to gain insight into questions such as the following. What people are most closely associated with a given organization? What people are most closely associated with each other? What locations are most closely associated with a given person? As FIG. 4 shows, use of k values less than 300 here will result in some terms being dropped from the upper ranks of lists generated by queries relevant to such questions. The precise impact of this phenomenon can vary with the application. However, in general it is clear that there will be a growing degradation of representational fidelity as the dimensionality is reduced below k=300. Depending upon the application, such behavior may preclude use of dimensionality less than 300. In all of the cases investigated here, divergences such as those presented in FIG. 4 represented a genuine departure from real world associations. As an example of this, Table 2 shows the 10 most highly ranked terms for the query term Einstein for $S_{5M}$ at selected values of k.

TABLE 2

Top 10 Ranked Terms for Selected k Values for Query Term "Einstein."

| k = 10 | k = 50 | k = 100 | k = 500 |
|---|---|---|---|
| Weaves | Einstein's | Einstein's | Einstein's |
| intermix | mathematicians | Mathematicians | Heisenberg |
| malignancy | Bhagavad-gita | Mathematician | cosmology |
| compass | Exploratorium | Cosmology | Bohr |
| nourishing | half-basement | UCLA's | mathematician |
| Iliad | extraterrestrial | Heisenberg | neutrinos |
| vortex | Bohr's | Bhagavad-gita | physicist |
| nature's | Zato-based | Bohr's | mathematicians |
| accurate | Korzeneva | Astrophysicists | neutrino |

Figure 5:
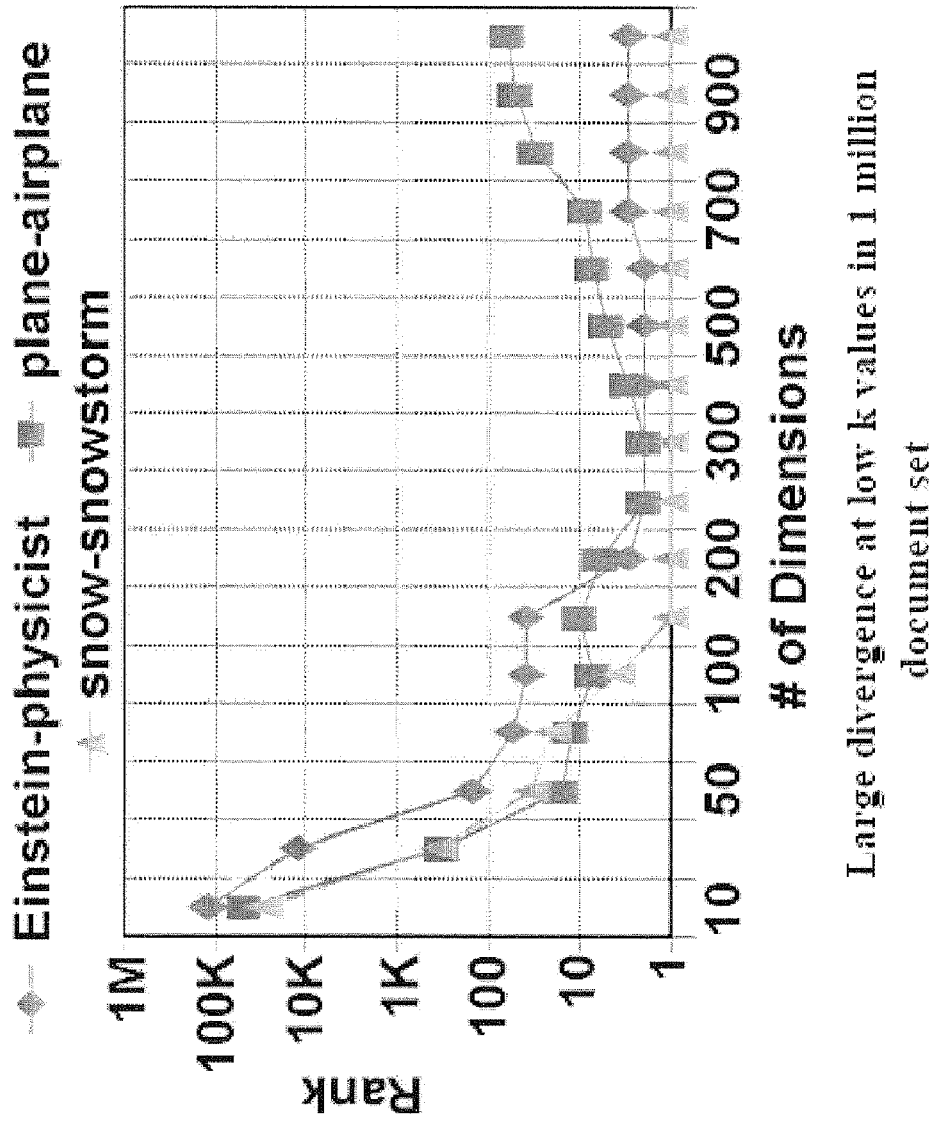
FIG. 5 illustrates the variation in rank between vectors representing terms in the pairs "Einstein"-"physicist," "plane"-"airplane," and "snow"-"snowstorm" in LSI spaces of dimension k constructed to represent $S_{1M}$, a 1,000,000 document subset of $S_{5M}$.
Figure 6:
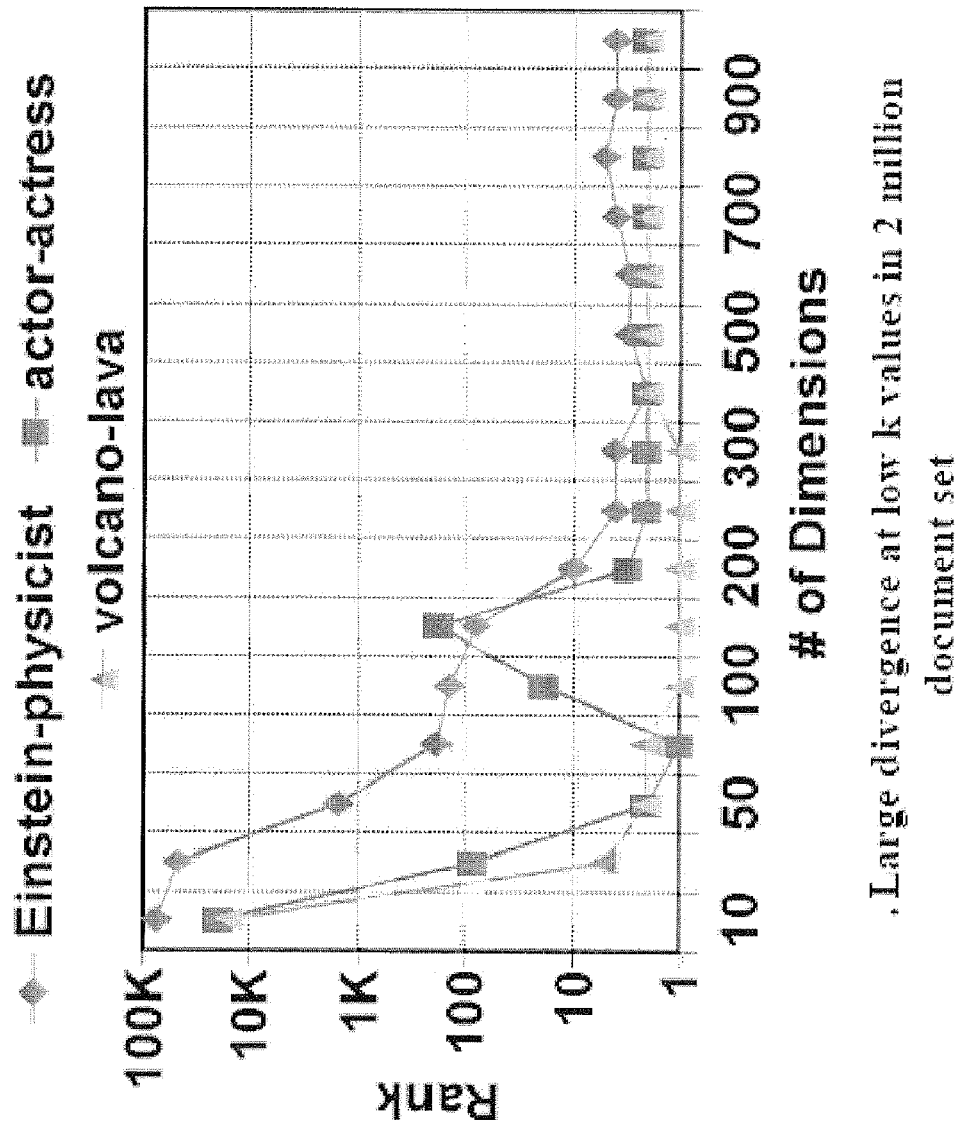
FIG. 6 illustrates the variation in rank between vectors representing terms in the pairs "Einstein"-"physicist," "plane"-"airplane," and "snow"-"snowstorm" in LSI spaces of dimension k constructed to represent $S_{1M}$, a 1,000,000 document subset of $S_{5M}$.

For this term pair, from k=300 to k=1000, the 10 top-ranked terms vary only slightly. All are intuitively reasonable. At dimensions less than 300, the top 10 terms start to become less relevant. At k=10, the terms are only vaguely relevant to the query term. At this low dimensionality, the rank of "physicist" with respect to the query term "Einstein" is >400,000. At that dimensionality, "typist" is much closer to "Einstein" than is "physicist." Clearly such instances mark a substantial degradation in the fidelity of the LSI space in representing real-world associations. The same type of divergence is also noted in the $S_{1m}$ and $S_{2M}$ as shown in FIGS. 5 and 6.

The divergences shown in these figures are not the result of idiosyncrasies of term distributions in a small number of documents. Every term used in the examples presented here appears at least one hundred times in the test collections. The median number of occurrences of the example terms in the $S_{5M}$ is nearly 25,000. There are roughly proportionate numbers of occurrences for these terms in $S_{1M}$ and $S_{2M}$.

Figure 7:
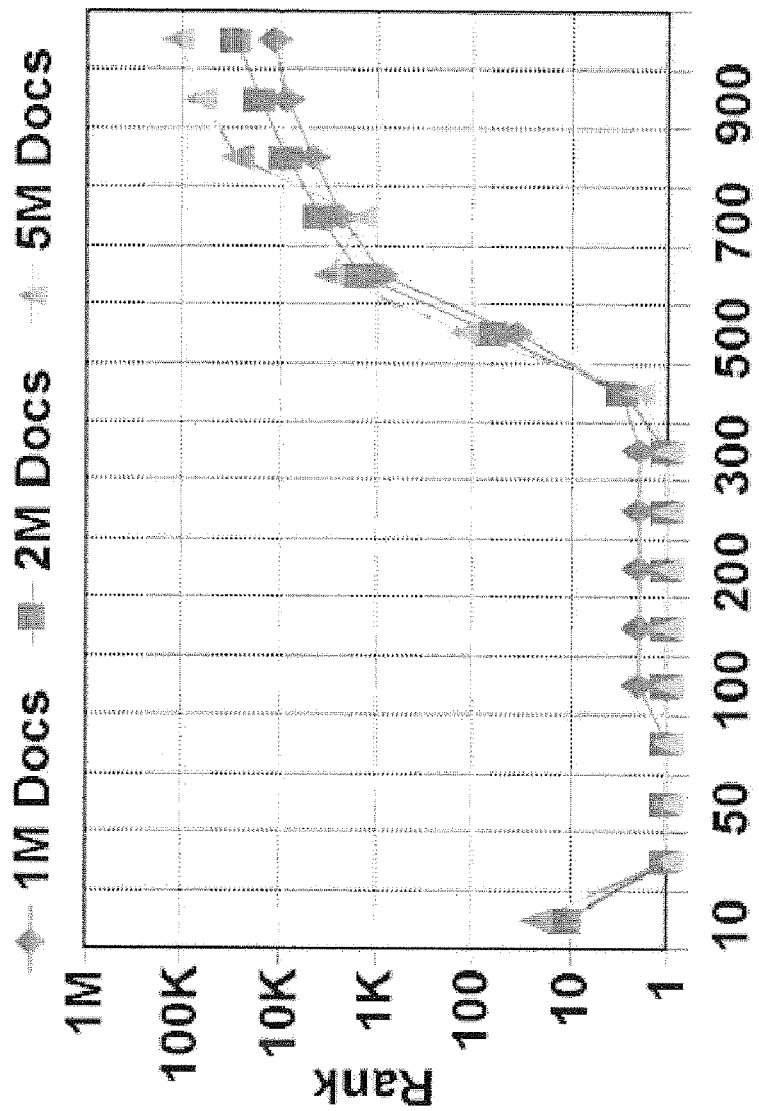
FIG. 7 illustrates the variation in rank between vectors representing terms in the pair "Russian"-"Russian," in LSI spaces of dimension k constructed to represent $S_{1M}$, $S_{2M}$, and $S_{5M}$.

For some pairs of terms, there is an exponential divergence of rank at high values of k. FIG. 7 shows the growth in rank for the three data sets for the term pair "Russia-Russian." For this term pair, the larger the test collection, the greater the divergence. This is true in both an absolute sense (rank) and a relative sense (relative to the number of documents or the number of terms in the respective collections).

This figure illustrates the effect of LSI dimensionality on the degree to which the semantic space correlates to real world observations. For k varying from 25 to 300, the terms "Russia" and "Russian" are very closely associated, which matches our real world expectations. For the $S_{5M}$ and $S_{2M}$, at k=300 the term closest to "Russia" is "Russian." For the $S_{1M}$, at k=300, "Russian" is the second closest term (the closest is Russia's). However, at k=1000, the rank of "Russian" with respect to "Russia" in the three test sets ranges from more than 10,000 to more than 100,000. In this example, as above, the larger the test set, the greater the divergence.

This divergence is not a unique aspect of "Russian" as compared to "Russia." At k=300, for all three test sets, the 10 top-ranked terms all appear to be quite reasonable from the point of view of what would be expected of real-world associations. For example, in $S_{5M}$, the plural form and the possessive case of "Russia" are the closest terms. "Moscow" is the next closest. Thus, at this dimensionality, it would appear that the LSI representation vector for "Russia" does a good job of representing the general context expected of that term. At the higher k values, however, the terms appear more specialized. At k=1000, the entire top 10 terms from the k=300 case have fallen below rank=10. They have been replaced by terms that imply more specific contexts. For example, one is the name of a Russian television program. Another is the name of a Russian television personality.

As in the previous examples, this behavior is not an artifact of chance term distribution in a small number of documents. "Russia" and "Russian" appear hundreds of thousands to millions of times in these collections, as shown in Table 3.

TABLE 3

Occurrences of the Terms "Russia" and "Russian" in the Test Sets

|  | $S_{1M}$ | $S_{2M}$ | $S_{5M}$ |
|---|---|---|---|
| Russia | 386,896 | 740,895 | 1,850,095 |
| Russian | 545,883 | 1,049,977 | 2,645,803 |

As FIG. 7 shows, for terms such as this, use of k values greater than 400 will result in some terms being dropped from the upper ranks of lists generated by some user queries of the types described above. The precise impact of this will vary with the application. However, at least for this term pair, it is clear that there will be a growing degradation of representational fidelity as the dimensionality is increased beyond 400. Depending upon the application, such behavior may preclude use of dimensionality greater than 400.

Figure 8:
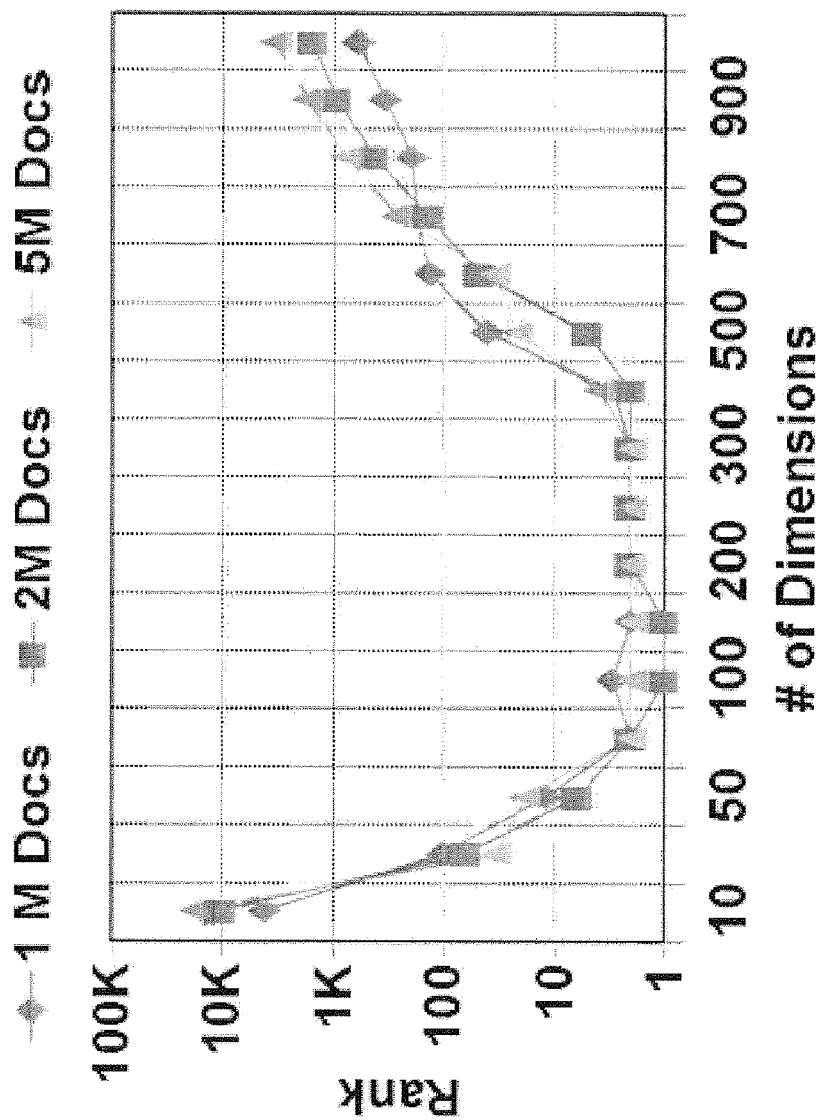
FIG. 8 illustrates the variation in rank between vectors representing terms in the pair "judge"-"court," in LSI spaces of dimension k constructed to represent $S_{1M}$, $S_{2M}$, and $S_{5M}$.

For some term pairs, the degree of divergence at both higher and lower values of k can be large. FIG. 8 shows the pattern for the query term pair "judge-court." Once again, the greatest difference corresponds to the largest test set. For $S_{5M}$, as k varies from 150 to 400, the top-ranked terms differ only slightly. All are general terms related to judges and courts. At lower and higher values of k, specific names of police inspectors, judges, and defendants appear in the top 10 list. It is apparent that these represent more specific associations emphasized at individual choices of dimensionality. At k=10, the common terms that prevail in the 150 to 400 range are almost completely replaced by specific names. At this dimensionality, the rank of "court" with respect to the query term "judge" is >17,000. At that dimensionality, "letterhead" is much closer to "judge" than is "court." At k=1000, the rank of "court" with respect to the query "judge" is >3,000. At that dimensionality, "video-makers" is much closer to "judge" than is "court."

Clearly, at both low and high dimensionality, there is a substantial degradation in the fidelity of the LSI space in representing real world associations.

As with the other examples presented here, the number of occurrences of these terms is large enough to ensure that the observed pattern is genuinely an effect of dimensionality. Table 4 shows the number of occurrences of the terms judge and court in the test sets.

TABLE 4

Occurrences of the Terms "judge" and "court" in the Test Sets

|  | $S_{1M}$ | $S_{2M}$ | $S_{5M}$ |
|---|---|---|---|
| judge | 40,155 | 79,469 | 189,542 |
| court | 239,255 | 475,483 | 1,077,532 |

Figure 9:
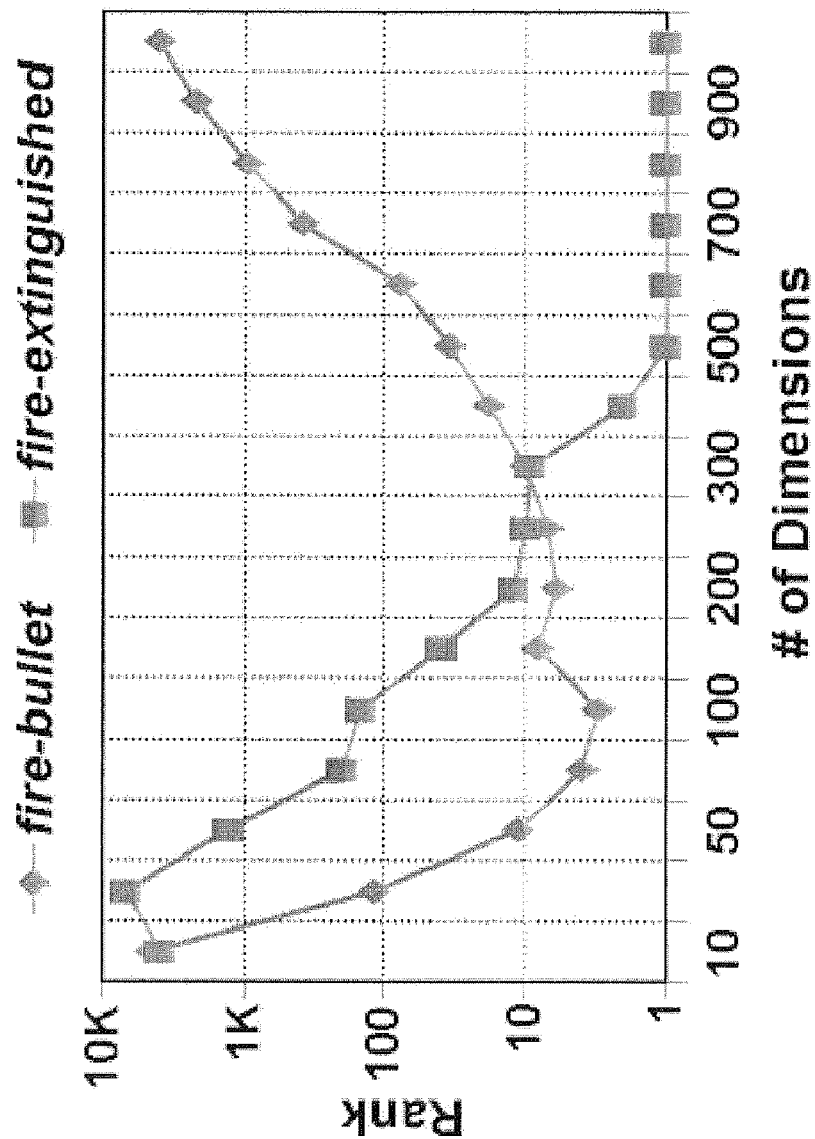
FIG. 9 illustrates the variation in cosine between vectors representing terms in the pairs "fire"-"bullet" and "fire"-"extinguished" in LSI spaces of dimension k constructed to represent $S_{5M}$.

For some related term pairs, there are quite different patterns of rank divergence. For example, FIG. 9 shows the case for the term pairs "fire-bullet" and "fire-extinguished" in $S_{5M}$. At k=10, "bullet" and "extinguished" are comparable in rank. From there through k=300, "bullet" is more highly ranked with respect to "fire" than "extinguished" is ranked with respect to "fire." At k=300, the two terms are of nearly equal rank. Above that point, the curves diverge. "Extinguished" is the most highly ranked term with respect to "fire" at k=500. It remains at rank 1 through k=1000. In contrast, above k=500, the rank of "bullet" diverges rapidly.

Overall, in this collection, "bullet" occurs much more often than "extinguished" as shown in Table 5. It is likely that the senses of "fire" that are present are distributed in a more or less comparable fashion. This type of divergence has been seen for other pairs of related terms where at least one term of the pair is polysemous. Polysemy is an important factor affecting relative ranking of many term pairs.

TABLE 5

Occurrences of the Terms from FIG. 9 in $S_{SM}$

| Term | # Occurrences | Term | # Occurrences |
|------|---------------|------|---------------|
| Fire | 317,477 | bullet | 22,238 |
|  |  | extinguished | 3,832 |

Figure 10:
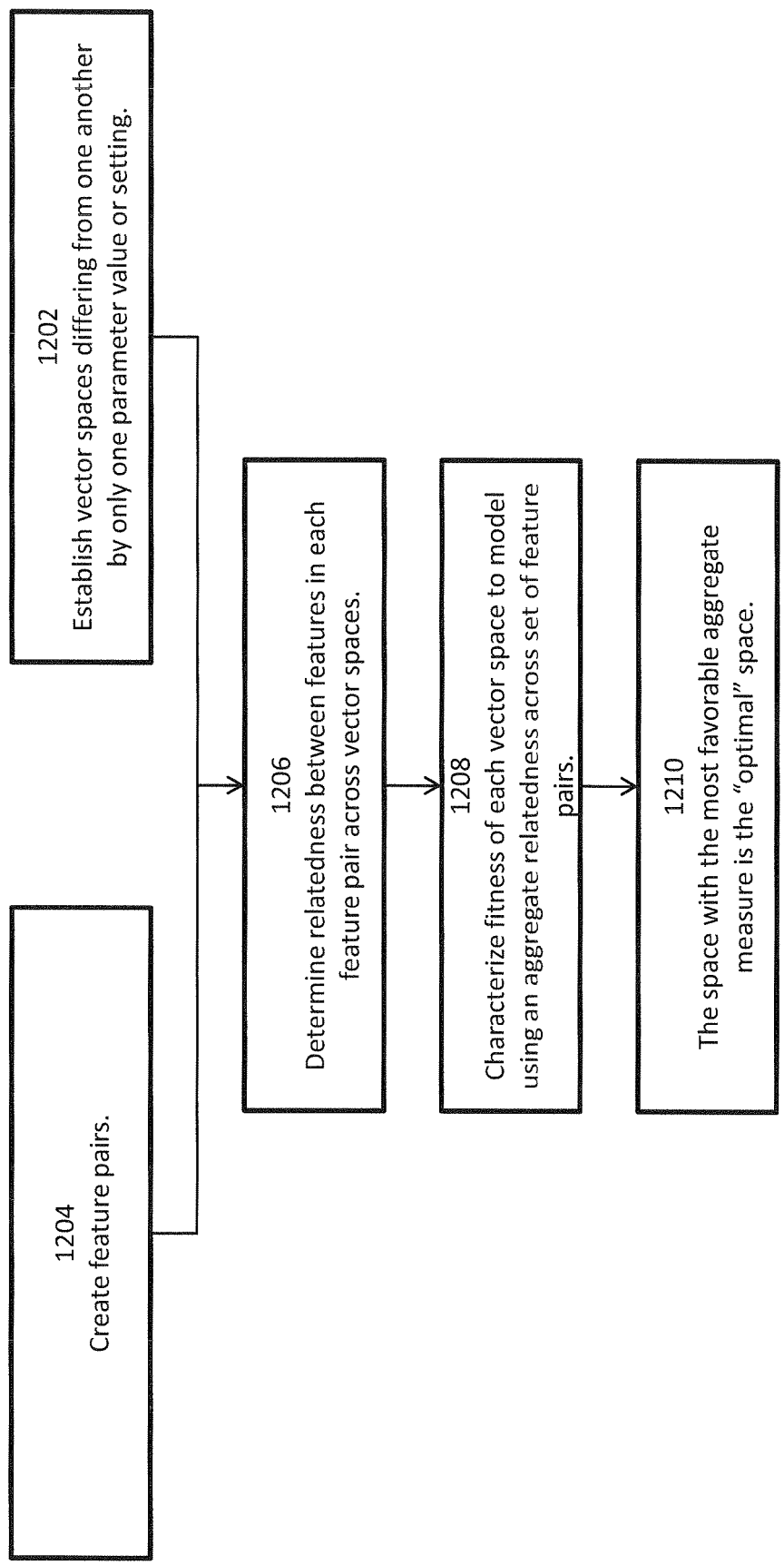
FIG. 10 illustrates a method of the technology.

Referring to FIG. 10, in some embodiments, the technology is part of a computer-implemented method for building and operating a database—where the database is a vector space representation of a set S of items (e.g., documents) and features of the items (e.g., terms found in the documents). In those embodiments, a number of semantic vector spaces, $V_{X,Y}$, each characterized by a set of free parameters $X=\{x_1, x_2, \ldots x_i\}$ such as dimensionality k, and a set of settings $Y=\{y_1, y_2, \ldots y_j\}$ such as comparison metric, is established 1202 representing the items and features in S. The spaces differ in only the same single parameter or setting across some subset of the range of the parameter or setting, e.g., dimensionality k at discrete points over the range 10-1000. In some embodiments, the intervals between discrete points are substantially logarithmic. In some embodiments, the spaces differ in only a single setting, e.g., whether word stemming is on or off (two discrete points), the content of 1 number of stop-word lists (1 discrete points). In some embodiments, the technology evaluates the effect of multiple parameter and setting choices concurrently.

A set of feature pairs P, each pair consisting of features from S determined, substantially independent of S, to be related, e.g., observed in the real world, is created 1204. For example, where S contains features including each North American country and each North American capitol, P can contain the pairs "Washington-United States," and "Ottawa-Canada." In some embodiments, P can comprise items, e.g., documents, of known similarity, or even item-feature pairs. Examples of document-document comparisons include patent-patent application and technical article-keyword list. One example of item-feature comparison is technical article-keyword. In some embodiments, not all elements of all pairs can be found in S. For example, embodiments of the technology can employ P that includes common synonyms, some of which might not be found in S.

The relatedness of the elements of each feature pair in P in the context of a vector space $V_{XY}$ is determined 1206. In some embodiments, this is done by using a first element of each pair as a query into $V_{XY}$, then ranking the features returned in response to each query in order of measure of closeness (e.g., cosine between the vectors of each element in the pair). The rank of the second element of the pair is used as a measure of relatedness between the elements.

An aggregate measure of the closeness of elements in each feature pair in P, e.g. an average, a mean, is used to characterize the fitness of the space $V_{XY}$ to model S 1208. Methods of the technology determine this aggregate measure for each $V_{XY}$ across the subset of the range of the varied parameter or setting. The configuration of the space $V_{XY}$ with the most favorable, i.e. "optimum" as used here, aggregate measure is used to as the favored configuration 1210.

In some embodiments, the results of the method are displayed to a user. In some embodiments, the favored configuration is queried in a fashion familiar to those of skill in the semantic space arts and a database of the technology returns results corresponding to a set of real world items S.

The present technology can take the form of hardware, software or both hardware and software elements. In some embodiments, the technology is implemented in software, which includes but is not limited to firmware, resident software, microcode, an FPGA or ASIC, etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some embodiments, the data processing system is implemented using one or both of FPGAs and ASICs.

APPENDIX I

| | | | | | |
|---|---|---|---|---|---|
| accelerate | quicken | fire | extinguished | ocean | Seas |
| acid | alkaline | fire | smoke | painting | Artist |
| acid | acidic | fire | volley | Paris | France |
| actor | actress | fire | firefighters | Peru | Lima |
| admit | confess | fisherman | fishing | petroleum | Barrels |
| airbus | A380 | France | French | petroleum | Oil |
| airport | taxiway | fungus | fungi | PhD | doctorate |
| airport | airplane | gasoline | diesel | phenomenon | phenomena |
| alumnus | alumni | generator | turbine | philharmonic | orchestra |
| America | American | geology | geologist | photoresist | lithography |
| anesthetic | anesthesia | geostationary | orbit | Picasso | Painter |
| Angola | Luanda | geosynchronous | orbit | plane | Copilot |
| astronomy | telescope | Germany | Berlin | poison | poisonous |
| atomic | uranium | Germany | German | Portugal | Lisbon |
| attack | attacker | glad | happy | Prague | Czech |
| Australia | Canberra | Gorbachev | Brezhnev | prison | Inmates |
| automobile | auto | Gore | Clinton | produce | Product |
| bacillus | bacteria | gyroscope | gyro | professor | university |
| bacterium | bacteria | Haiti | Aristide | pupil | School |
| bad | evil | haiti | haitian | puppy | Dog |
| ballerina | ballet | Havana | Cuba | qadhafi | Qaddafi |
| baseball | pitcher | Hawaii | Honolulu | queen | King |
| battle | battleground | Hawaii | Hawiian | Quito | Ecuador |
| beautiful | gorgeous | helicopter | chopper | quran | Koran |
| beethoven | symphony | highway | road | rain | Rainfall |
| bishkek | kyrgyz | history | historical | ramses | Egypt |
| boat | vessel | Hollywood | movies | react | Reacted |
| boy | girl | Honduras | Tegucigalpa | Reagan | Gingrich |
| brewery | beer | Honduras | Honduran | replicate | replication |
| bucharest | romanian | hospital | clinic | rich | Wealthy |
| build | construct | Hungary | Budapest | rifle | Carbine |
| butter | bread | Hungary | Hungarian | river | tributaries |
| Cambodia | Cambodian | husband | wife | river | Riverbed |
| Canada | Canadian | IBM | computers | Riyadh | Jeddah |
| candidate | candidacy | India | Bombay | Rome | Italy |
| caracas | venezuelan | Indonesia | Jakarta | run | Running |
| carbon | dioxide | Indonesia | Indonesian | russia | Russian |
| carols | Christmas | insecticide | pesticide | safe | Secure |
| Castro | Cuba | iron | steel | sars | respiratory |
| cattle | cows | islam | quran | school | Pupils |
| China | Beijing | Israel | Gurion | Schroeder | Kohl |
| Christmas | xmas | Italy | Italian | scream | Yell |
| cigarette | tobacco | Japan | Japanese | sculpture | Sculptor |
| cirrhosis | liver | Jordan | Amman | ship | Vessel |
| cloud | clouds | judge | court | shoe | Sock |
| cmos | transistor | judge | judges | sky | Clouds |
| coat | jacket | judge | courts | snow | snowstorm |
| colloseum | rome | Kabul | Afghanistan | spain | spaniards |
| condoleeza | condoleezza | kampala | uganda | Spain | Spanish |
| correct | accurate | Kenya | Nairobi | Stalin | Lenin |
| creditor | debt | king | monarch | strike | unionized |
| crime | criminal | laser | beams | surround | Encircle |
| Denmark | Copenhagen | laser | beam | suva | Fiji |
| dentist | dental | latvia | riga | Sweden | Stockholm |
| destroy | destructive | lawmaking | legislature | Sweden | Swedish |
| dialysis | kidney | learn | teach | swim | Swam |
| diamond | carat | Liberia | Monrovia | symphony | orchestra |
| diplomat | ambassador | lightning | thunder | synagogue | Jewish |
| discuss | discussion | ljubljana | slovenia | Syria | Damascus |
| disease | infected | locomotive | railroad | tallinn | Estonian |
| dock | ship | lunch | dinner | television | Channel |
| doctor | physician | Madrid | Spain | Thailand | Thai |
| dollar | currency | manila | phillipine | tooth | Teeth |
| drone | uav | manufacture | manufacturing | Truman | Eisenhower |
| dushanbe | tajikistan | marry | marriage | tsunami | Tidal |
| earnings | profit | matrix | matrices | UNMOVIC | inspectors |
| earthquake | quake | mecca | pilgrimage | uruguay | uruguyan |
| Edinburgh | Scotland | Mexico | Mexican | uzbekistan | Tashkent |
| Egypt | Cairo | microscope | microscopy | Vatican | Pope |
| Egypt | Egyptian | Mitterand | Chirac | Vienna | Austria |
| einstein | physicist | mongolia | ulaanbaatar | vientiane | Laos |
| employee | worker | Moscow | Russia | Vietnam | Vietnamese |
| enemy | foe | mountain | mountainous | vilnius | Lithuania |
| England | Britain | mouse | mice | volcano | Lava |
| England | British | movie | box-office | water | Drinking |
| epidemic | disease | Mugabe | Zimbabwe | whale | cetacean |
| Eritrea | Asmara | murder | murderer | windhoek | namibian |
| estuary | river | Musharraf | Pakistan | woman | Women |
| fermented | beer | nanotechnology | nanotech | Yangtse | River |
| Finland | Helsinki | NASA | spacecraft | microscope | microscopy |

APPENDIX I-continued

| Finland | Finnish | NASA | shuttles | vegas | Casino |
|---|---|---|---|---|---|
| fire | bullet | night | midnight | wedding | Bride |
| fire | fired | Norway | Norwegian | | |
| fire | gunfire | nuclear | atomic | | |

The invention claimed is:

1. A method of representing in a database, a collection of items characterized by features, the method comprising:
in a data processing system:
determining a plurality of semantic space representations of the features across the collection, each semantic space representation:
characterized by parameters and settings, and differing from each other by only one of:
the value of one parameter, and
the configuration of one setting;
determining, for each feature pair of a set of feature pairs, the relatedness of the first feature to the second feature in each semantic space representation;
representing the collection by the semantic space representation that provides the best aggregate relatedness across the set of feature pairs.

2. The method of claim 1, wherein:
the relatedness of the first feature to the second feature is determined as rank of the second feature in response to a query comprising the first feature into each semantic space representation.

3. The method of claim 2, wherein:
the aggregate relatedness is measured as the average determined rank.

4. The method of claim 1, wherein:
each semantic space representation differs from each other semantic space representation by the value of dimensionality k.

5. A computer program product for representing in a database, a collection of items characterized by features, the computer program product comprising:
the non-transitory computer readable media, and
programming modules:
stored on the non-transitory media, and
operative, when executed in a data processing system to:
determine a plurality of semantic space representations of the features across the collection, each semantic space representation:
characterized by parameters and settings, and differing from each other by only one of:
the value of one parameter, and the configuration of one setting;
determine, for each feature pair of a set of feature pairs, the relatedness of the first feature to the second feature in each semantic space representation;
represent the collection by the semantic space representation that provides the best aggregate relatedness across the set of feature pairs.

6. The computer program product of claim 5, wherein:
the relatedness of the first feature to the second feature is determined as rank of the second feature in response to a query comprising the first feature into each semantic space representation.

7. The computer program product of claim 6, wherein:
the aggregate relatedness is measured as the average determined rank.

8. The computer program product of claim 5, wherein each semantic space representation differs from each other representation by the value of dimensionality k.

* * * * *